US006591307B1

(12) United States Patent
Arimilli et al.

(10) Patent No.: US 6,591,307 B1
(45) Date of Patent: Jul. 8, 2003

(54) MULTI-NODE DATA PROCESSING SYSTEM AND METHOD OF QUEUE MANAGEMENT IN WHICH A QUEUED OPERATION IS SPECULATIVELY CANCELLED IN RESPONSE TO A PARTIAL COMBINED RESPONSE

(75) Inventors: Ravi Kumar Arimilli, Austin, TX (US); James Stephen Fields, Jr., Austin, TX (US); Guy Lynn Guthrie, Austin, TX (US); Jody Bern Joyner, Austin, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,897

(22) Filed: Nov. 9, 1999

(51) Int. Cl.[7] .................................................. G06F 1/12
(52) U.S. Cl. ....................... 709/400; 709/201; 709/202; 709/232; 709/400; 711/141; 711/146; 712/28
(58) Field of Search ................................ 709/201, 202, 709/220, 400, 232; 711/146, 118, 141; 712/28

(56) References Cited

U.S. PATENT DOCUMENTS

| | | |
|---|---|---|
| 3,766,526 A | 10/1973 | Buchanan |
| 4,905,145 A | 2/1990 | Sauber |
| 5,032,985 A | 7/1991 | Curran et al. |
| 5,081,623 A | 1/1992 | Ainscow |
| 5,179,715 A | 1/1993 | Andoh et al. |
| 5,327,570 A | 7/1994 | Foster et al. |
| 5,488,694 A | 1/1996 | McKee et al. |
| 5,588,122 A | 12/1996 | Garcia |
| 5,592,622 A | 1/1997 | Isfeld et al. |
| 5,623,628 A | 4/1997 | Brayton et al. |
| 5,659,759 A | 8/1997 | Yamadia |
| 5,715,428 A | 2/1998 | Wang et al. |
| 5,734,922 A * | 3/1998 | Hagersten et al. |

(List continued on next page.)

OTHER PUBLICATIONS

Farrens et al., "Workload and Implementation Considerations for Dynamic Base Register Caching", Proceedings of the 24th Annual International Symposium on Microarchitecture, pp. 62–62, Nov. 1991.

Cho et al., "Removing Timing Contraints of Snooping in a Bus–Based COMA Multiprocessor", International Conference on Parallel and Distributed Computing and Systems, Oct. 1996.

Preiss et al., "A Cache–based Message Passing Scheme for a Shared–Bus", The 15th Annual International Symposium on Computer Archtiecture, pp. 358–364, Jun. 1988.

Park et al., "Address Compression Through Base Register Caching", Proceedings of the 23rd Annual Workshop and Symposium on Microprogramming and Microarchitecture, pp. 193–199, 1990.

*Primary Examiner*—Ayaz Sheikh
*Assistant Examiner*—Young Won
(74) *Attorney, Agent, or Firm*—Casimer K. Salys; Bracewell & Patterson, L.L.P.

(57) ABSTRACT

A data processing system includes an interconnect, a plurality of nodes coupled to the interconnect that each include at least one agent, response logic within each node, and a queue. In response to snooping a transaction on the interconnect, each agent outputs a snoop response. In addition, the queue, which has an associated agent, allocates an entry to service the transaction. The response logic within each node accumulates a partial combined response of its node and any preceding node until a complete combined response for all of the plurality of nodes is obtained. However, prior to the associated agent receiving the complete combined response, the queue speculatively deallocates the entry if the partial combined response indicates that an agent other than the associated agent will service the transaction.

14 Claims, 6 Drawing Sheets

U.S. PATENT DOCUMENTS

| | | | |
|---|---|---|---|
| 5,781,757 A | * | 7/1998 | Deshpande |
| 5,787,468 A | | 7/1998 | Clark |
| 5,852,716 A | | 12/1998 | Hagersten |
| 5,860,109 A | | 1/1999 | Hagersten et al. |
| 5,881,312 A | | 3/1999 | Dulong |
| 5,884,046 A | | 3/1999 | Antonov |
| 5,887,138 A | | 3/1999 | Hagersten et al. |
| 5,895,484 A | * | 4/1999 | Arimilli et al. |
| 5,937,167 A | | 8/1999 | Arimilli et al. |
| 5,938,765 A | | 8/1999 | Dove et al. |
| 5,958,011 A | | 9/1999 | Arimilli et al. |
| 5,958,019 A | * | 9/1999 | Hagersten et al. |
| 5,983,301 A | | 11/1999 | Baker et al. |
| 6,006,286 A | | 12/1999 | Baker et al. |
| 6,009,456 A | | 12/1999 | Frew et al. |
| 6,009,472 A | * | 12/1999 | Boudou et al. |
| 6,011,777 A | | 1/2000 | Kunzinger |
| 6,067,611 A | * | 5/2000 | Carpenter et al. |
| 6,081,874 A | * | 6/2000 | Carpenter et al. |
| 6,148,327 A | | 11/2000 | Whitebread et al. |
| 6,148,361 A | * | 11/2000 | Carpenter et al. |
| 6,161,189 A | | 12/2000 | Arimilli et al. |
| 6,181,262 B1 | | 1/2001 | Bennett |
| 6,219,741 B1 | | 4/2001 | Pawlowski et al. |
| 6,333,938 B1 | | 12/2001 | Baker |
| 6,338,122 B1 | * | 1/2002 | Baumgartner et al. |
| 6,343,347 B1 | * | 1/2002 | Arimilli et al. |
| 6,421,775 B1 | | 7/2002 | Brock et al. |

\* cited by examiner

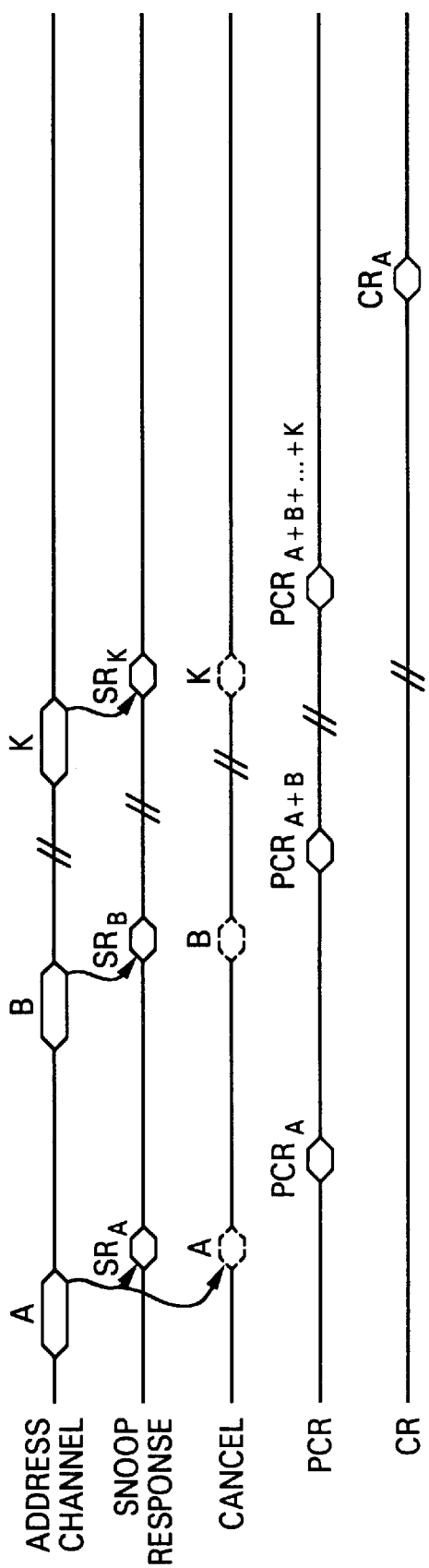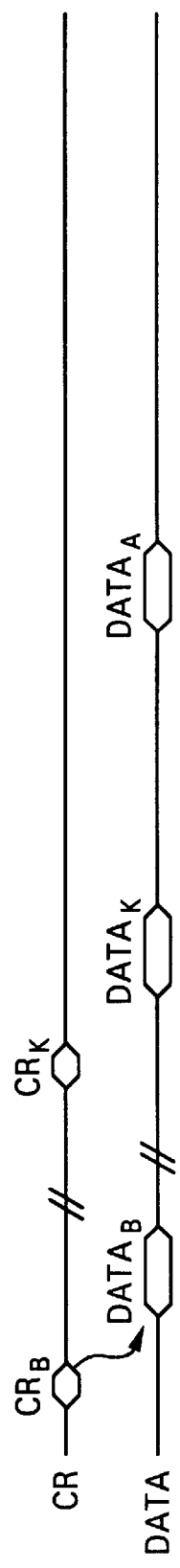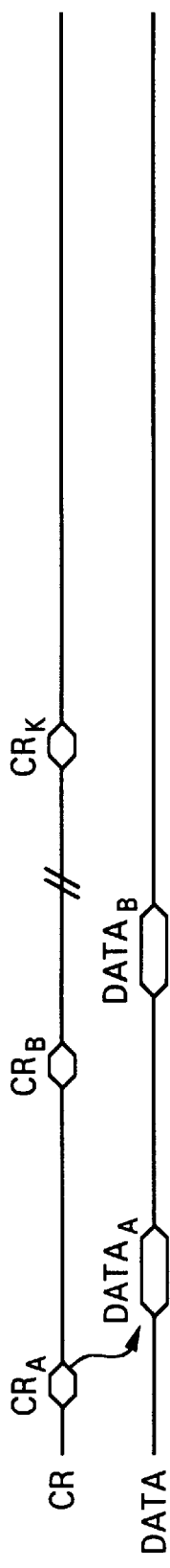
Fig. 5A
Fig. 5B
Fig. 5C

MULTI-NODE DATA PROCESSING SYSTEM AND METHOD OF QUEUE MANAGEMENT IN WHICH A QUEUED OPERATION IS SPECULATIVELY CANCELLED IN RESPONSE TO A PARTIAL COMBINED RESPONSE

CROSS-REFERENCE TO RELATED APPLICATIONS

The present application is related to the following co-pending applications, which are filed on even date herewith and incorporated herein by reference:

(1) U.S. application Ser. No. 09/436,898;

(2) U.S. application Ser. No. 09/436,899;

(3) U.S. application Ser. No. 09/436,901; and (4) U.S. application Ser. No. 09/436,900.

BACKGROUND OF THE INVENTION

1. Technical Field

The present invention relates in general to data processing and, in particular, to communication within a data processing system. Still more particularly, the present invention relates to a multi-node data processing system and communication protocol that support a partial combined response.

2. Description of the Related Art

It is well-known in the computer arts that greater computer system performance can be achieved by harnessing the processing power of multiple individual processors in tandem. Multi-processor (MP) computer systems can be designed with a number of different architectures, of which various ones may be better suited for particular applications depending upon the design point, performance requirements, and software environment of each application. Known architectures include, for example, the symmetric multiprocessor (SMP) and non-uniform memory access (NUMA) architectures. Until the present invention, it has generally been assumed that greater scalability and hence greater performance is obtained by designing more hierarchical computer systems, that is, computer systems having more layers of interconnects and fewer connections per interconnect.

The present invention recognizes, however, that such hierarchical computer systems incur extremely high access latency for the percentage of data requests and other transactions that must be communicated between processors coupled to different interconnects. For example, even for the relatively simple case of an 8-way SMP system in which four processors present in each of two nodes are coupled by an upper level bus and the two nodes are themselves coupled by a lower level bus, communication of a data request between processors in different nodes will incur bus aquisition and other transaction-related latency at each of three buses. Because such latencies are only compounded by increasing the depth of the interconnect hierarchy, the present invention recognizes that it would be desirable and advantageous to provide an improved data processing system architecture having reduced latency for transaction between physically remote processors.

SUMMARY OF THE INVENTION

The present invention realizes the above and other advantages in a multi-node data processing system having a non-hierarchical interconnect architecture.

In accordance with the present invention, a data processing system includes an interconnect, a plurality of nodes coupled to the interconnect that each include at least one agent, response logic within each node, and a queue. In response to snooping a transaction on the interconnect, each agent outputs a snoop response. In addition, the queue, which has an associated agent, allocates an entry to service the transaction. The response logic within each node accumulates a partial combined response of its node and any preceding node until a complete combined response for all of the plurality of nodes is obtained. However, prior to the associated agent receiving the complete combined response, the queue speculatively deallocates the entry if the partial combined response indicates that an agent other than the associated agent will service the transaction.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5A is a timing diagram of an exemplary address transaction in the data processing system illustrated in FIG. 1;

FIG. 5B is a timing diagram of an exemplary read-data transaction in the data processing system depicted in FIG. 1;

FIG. 5C is a timing diagram of an exemplary write-data transaction in the data processing system illustrated in FIG. 1;

DETAILED DESCRIPTION OF ILLUSTRATIVE EMBODIMENT

Figure 1:
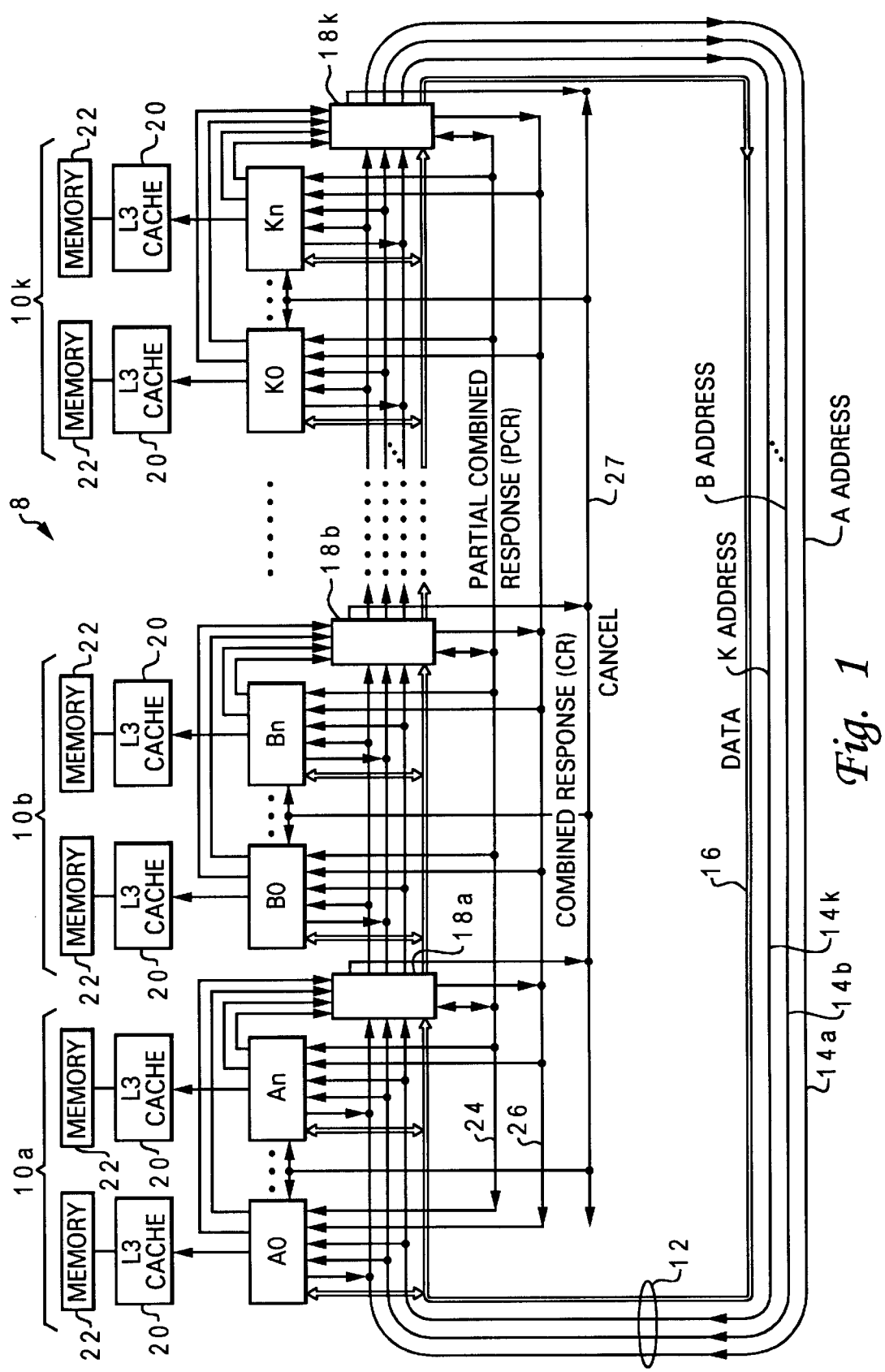
FIG. 1 depicts an illustrative embodiment of a multi-node data processing system having a non-hierarchical interconnect architecture in accordance with the present invention.

With reference now to the figures and in particular with reference to FIG. 1, there is depicted an illustrative embodiment of a multi-node data processing system 8 having a non-hierarchical interconnect architecture in accordance with the present invention. As shown, data processing system 8 includes a number of nodes 10a–10k, which are coupled together in a ring configuration by a segmented interconnect 12 having one segment per node 10.

In addition to a segment of interconnect 12, each node 10 of data processing system 8 includes one or more agents that are each coupled to interconnect 12 and are designated A0–An for node 10a, B0–Bn for node 10b, etc. Each node 10 also includes respective response and flow control logic 18 that controls the flow of transactions on interconnect 12 between its node 10 and a neighboring node 10 and generates sideband signals (discussed below) that indicate how agents snooping a request should respond. The number of agents within each node 10 is preferably limited to an interconnect-dependent performance-optimized number (e.g., 8 or 16), with greater system scale being achieved by adding additional nodes 10 to data processing system 8.

Turning now more specifically to the interconnect architecture of data processing system 8, interconnect 12 includes at least one (and in the illustrated embodiment a single) data channel 16 and a plurality of non-blocking address channels 14a–14k that are each associated with a respective one of nodes 10a–10k such that only agents within the associated node 10 can issue requests on an address channel 14. Each of address channels 14 and data channel 16 is segmented, as noted above, such that each node 10 contains a segment of each address and data channel, and each address and data channel segment is coupled to at least two neighboring segments of the same channel. As indicated by arrows, each channel is also uni-directional, meaning that address and data transactions on interconnect 12 are only propagated between neighboring nodes 10 in the indicated direction. In the illustrated embodiment, each segment of an address channel 14 is implemented as an address bus that conveys 32 address bits in parallel, and each segment of data channel 16 is implemented as a data bus that conveys 16 data bytes in parallel; however, it will be appreciated that individual segments of interconnect 12 can alternatively be implemented with switch-based or hybrid interconnects and that other embodiments of the present invention may implement different channel widths.

In conjunction with interconnect 12, data processing system 8 implements three sideband channels—a partial combined response channel 24, a combined response channel 26, and a cancel channel 27—to respectively communicate partial combined responses, combined responses, and a cancel (or stomp) signal. As utilized herein, a partial combined response (or PCR) is defined as a cumulative response to a request of all agents within fewer than all nodes, and a combined response (or CR) is defined as a cumulative response to a request by all agents in all nodes. As discussed further below, agents are able to determine by reference to the PCR, CR, and cancel signal associated with a request snooped on an address channel 14 whether or not to service the request.

Figure 2:
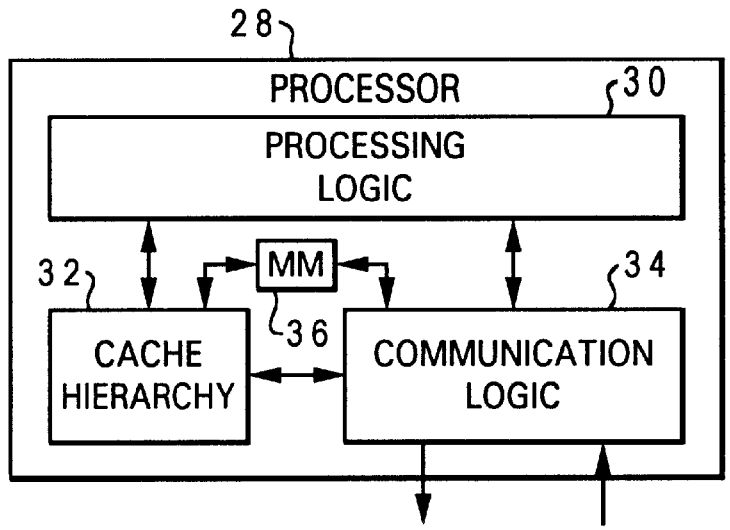
FIG. 2 is a more detailed block diagram of a processor embodiment of an agent within the data processing system of FIG. 1.

Referring now to FIG. 2, there is depicted a block diagram of a processor 28 that can be utilized to implement any agent within data processing system 8. Although hereafter it is assumed that each agent within data processing system 8 is a processor, it should be understood that an agent can be any device capable of supporting the communication protocol described herein.

As shown in FIG. 2, processor 28 includes processing logic 30 for processing instructions and data, communication logic 34, which implements a communication protocol that governs communication on interconnect 12, and a cache hierarchy 32 that provides local, low latency storage for instructions and data. In addition to cache hierarchy 32, which may include, for example, level one (L1) and level two (L2) caches, the local storage of each processor 28 may include an associated off-chip level three (L3) cache 20 and local memory 22, as shown in FIG. 1. Instructions and data are preferably distributed among local memories 22 such that the aggregate of the contents of all local memories 22 forms a shared "main memory" that is accessible to any agent within data processing system 8. Hereinafter, the local memory 22 containing a storage location associated with a particular address is said to be the home local memory for that address, and the agent interposed between the home local memory and interconnect 12 is said to be the home agent for that address. As shown in FIG. 2, each home agent has a memory map 36 accessible to cache hierarchy 32 and communication logic 34 that indicates only what memory addresses are contained in the attached local memory 22.

Figure 3:
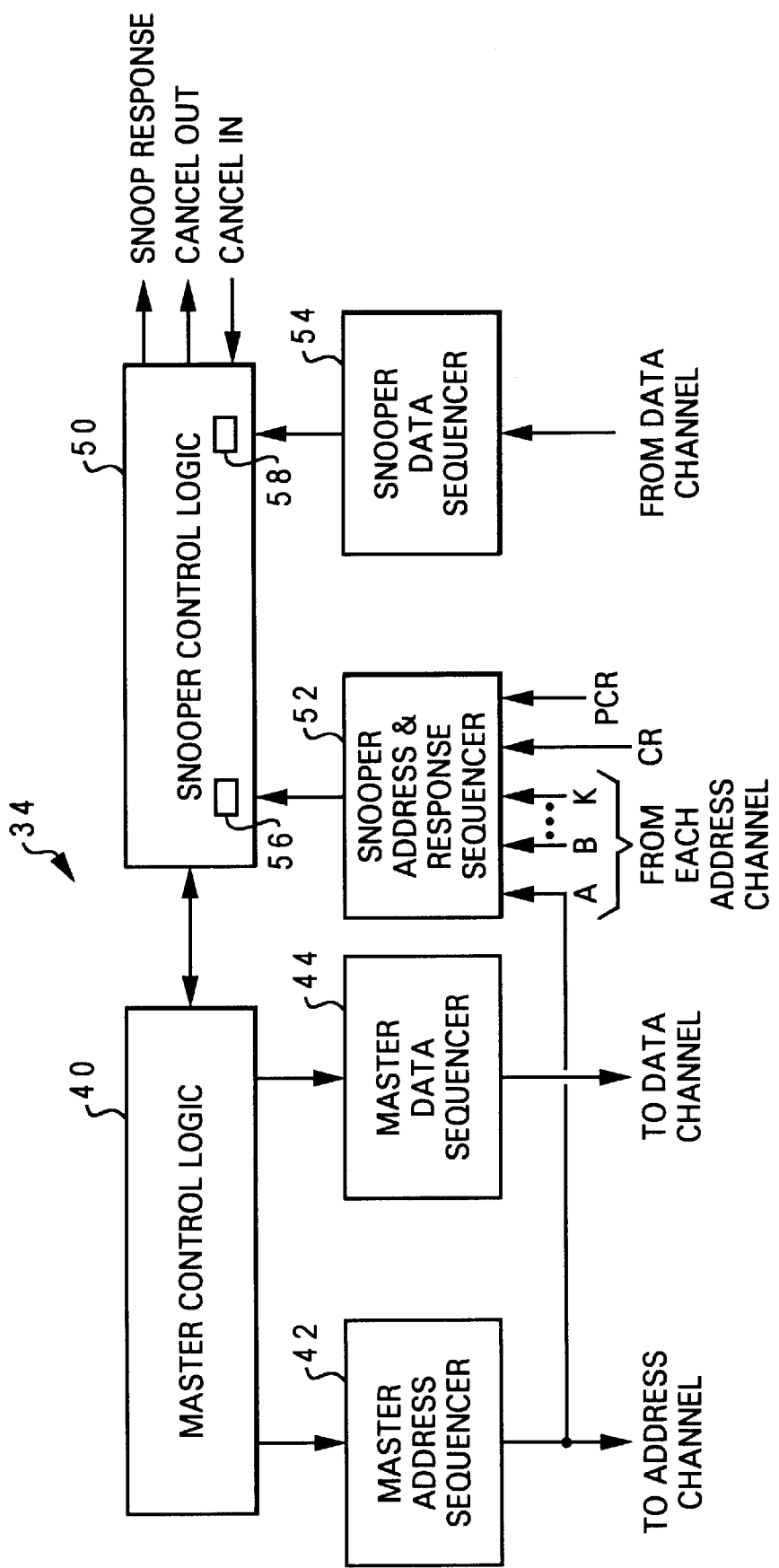
FIG. 3 is a more detailed block diagram of the communication logic of the processor in FIG. 2.

With reference now to FIG. 3, there is illustrated a more detailed block diagram representation of an illustrative embodiment of communication logic 34 of FIG. 2. As illustrated, communication logic 34 includes master circuitry comprising master control logic 40, a master address sequencer 42 for sourcing request (address) transactions on an address channel 14, and a master data sequencer 44 for sourcing data transactions on data channel 16. Importantly, to ensure that each of address channels 14 is non-blocking, the master address sequencer 42 of each agent within a given node 10 is connected to only the address channel 14 associated with its node 10. Thus, for example, the master address sequencer 42 of each of agents A0–An is connected to only address channel 14a, the master address sequencer 42 of each of agents B0–Bn is connected to only address channel 14b, and the master address sequencer 42 of each of agents K0–Kn is connected to only address channel 14k. To fairly allocate utilization of address channels 14 and ensure that local agents do not issue conflicting address transactions, some arbitration mechanism (e.g., round robin or time slice) should be utilized to arbitrate between agents within the same node 10.

By contrast, the master data sequencers 44 of all agents within data processing system 8 are connected to data channel 16. Although a large number of agents may be connected to data channel 16, in operation data channel 16 is also non-blocking since the types of data transactions that may be conveyed by data channel 16, which predominantly contain (1) modified data sourced from an agent other than the home agent, (2) data sourced from the home agent, and (3) modified data written back to the home local memory 22, are statistically infrequent for applications in which the distribution of memory among local memories 22 and the distribution of processes among the agents is optimized. Of course, in implementations including only a single data channel 16, some arbitration mechanism (e.g., round robin or time slice) should be utilized to arbitrate between agents within the same node 10 to ensure that local agents do not issue conflicting data transactions.

Communication logic 34 also includes snooper circuitry comprising a snooper address and response sequencer 52 coupled to each address channel 14 and to sideband response channels 24 and 26, a snooper data sequencer 54 coupled to data channel 16, and snooper control logic 50 connected to snooper address and response sequencer 52 and to snooper data sequencer 54. In response to receipt of a request transaction by snooper address and response sequencer 52 or a data transaction by snooper data sequencer 54, the transaction is passed to snooper control logic 50. Snooper control logic 50 processes the transaction in accordance with the implemented communication protocol and, if a request transaction, provides a snoop response and possibly a cancel signal to its node's response and flow control logic 18. Depending upon the type of transaction received, snooper control logic 50 may initiate an update to a directory or data array of cache hierarchy 32, a write to the local memory 22, or some other action. Snooper control logic 50 performs such processing of request and data transactions from a set of request queues 56 and data queues 58, respectively.

Figure 4:
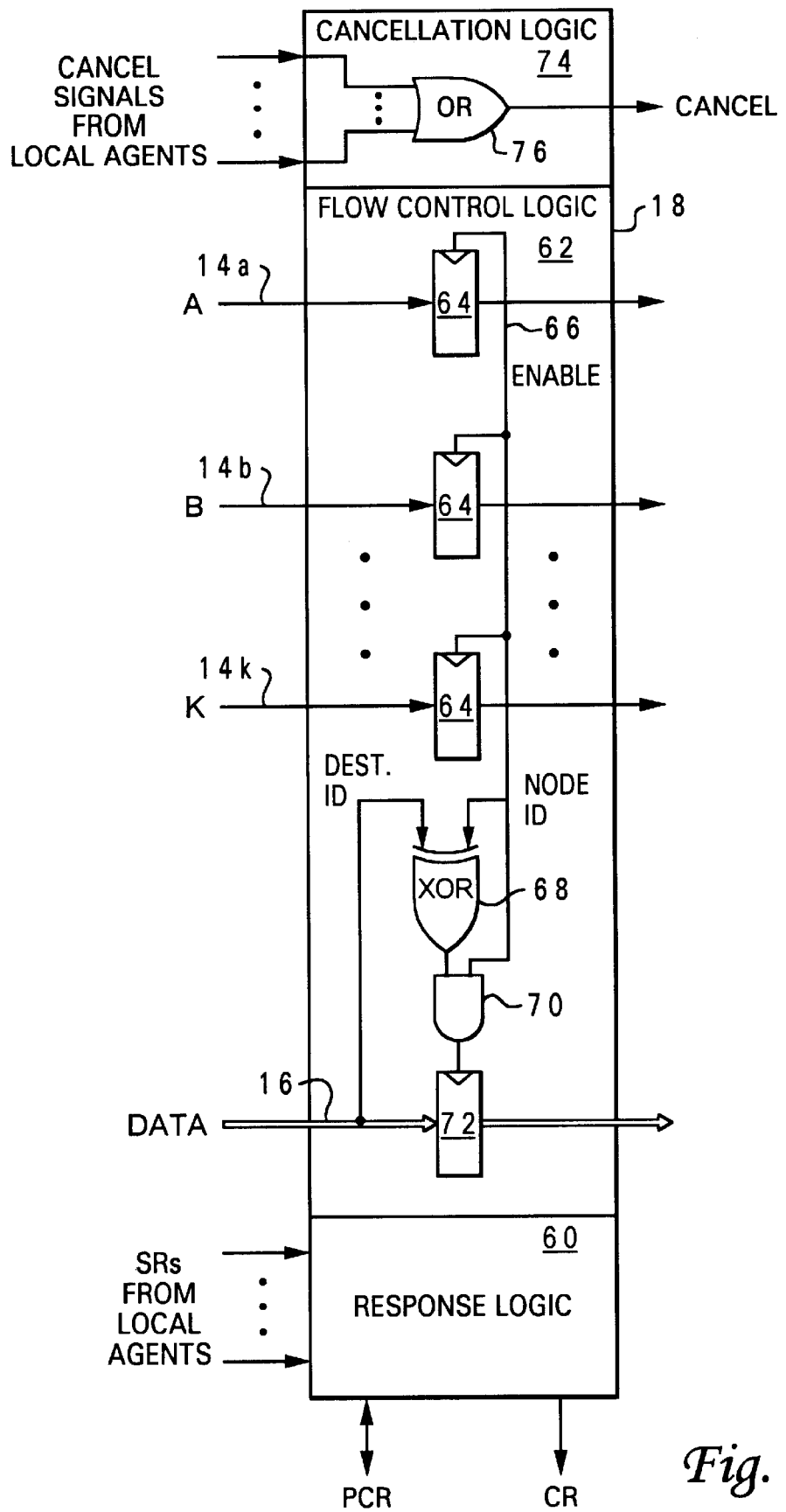
FIG. 4 is a more detailed block diagram of response and flow control logic within the data processing system shown in FIG. 1.

Referring now to FIG. 4, there is depicted a more detailed block diagram of an exemplary embodiment of response and flow control logic 18. As illustrated, response and flow control logic 18 includes response logic 60, which combines snoop responses from local agents and possibly a PCR from a neighboring node 10 to produce a cumulative PCR indicative of the partial combined response for all nodes that have received the associated transaction. For example, if agent A0 of node 10a masters a request on address channel 14a, agents A1–An provide snoop responses that are combined by response and flow control logic 18a to produce a $PCR_A$ that is provided on PCR bus 24. When the request is snooped by agents B0–Bn, agents B0–Bn similarly provide snoop responses, which are combined with $PCR_A$ of node 10a by response and flow control logic 18b to produce a cumulative $PCR_{A+B}$. This process continues until a complete combined; response is obtained (i.e., $PCR_{A+B+\ldots+K}$=CR). Once the CR is obtained, the CR is made visible to all nodes via CR channel 26. Depending upon the desired implementation, the CR for a request can be provided on CR channel 26 by the response and flow control logic 18 of either the last node 10 receiving the request or the master node 10 containing the master agent. It is presently preferable, both in terms of complexity and resource utilization, for the response logic 60 of the master node 10 to provide the CR for a request, thus permitting agents within the master node 10 to receive the CR prior to agents within any other node 10. This permits the master agent, for example, to retire queues in master control logic 40 which are allocated to the request as soon as possible.

As is further illustrated in FIG. 4, response and flow control logic 18 also contains flow control logic 62, which includes address latches 64 connecting neighboring segments of each of address channels 14a–14k. Address latches 64 are enabled by an enable signal 66, which can be derived from an interconnect clock, for example. Flow control logic 62 also includes a data latch 72 that connects neighboring segments of data channel 16. As indicated by enable logic including XOR gate 68 and AND gate 70, data latch 72 operates to output a data transaction to the neighboring segment of data channel 16 only if a the data transaction's destination identifier (ID) does not match the unique node ID of the current node 10 (i.e., if the data transaction specifies an intended recipient node 10 other than the current node 10). Thus, data transactions communicated on data channel 16, which can contain either read data or write data, propagate from the source node to the destination node (which may be the same node), utilizing only the segments of data channel 16 within these nodes and any intervening node(s) 10.

Each response and flow control logic 18 further includes cancellation logic 74, which is implemented as an OR gate 76 in the depicted embodiment. Cancellation logic 74 has an output coupled to cancel channel 27 and an input coupled to the cancel signal output of the snooper control logic 50 of each agent within the local node 10. The snooper control logic 50 of an agent asserts its cancel signal if the snooper control logic 50 determines, prior to receiving the PCR from another node 10, that a request issued by an agent within the local node 10 will be serviced by an agent within the local node 10. Depending on the desired implementation, the cancel signal can be asserted by either or both of the master agent that issued the request and the snooping agent that will service the request. In response to the assertion of the cancel signal of any agent within the node 10 containing the master agent, cancellation logic 74 assets a cancel signal on cancel channel 27, which instructs the snooper control logic 50 of agents in each other node 10 to ignore the request. Thus, the assertion of a cancel signal improves the queue utilization of agents in remote nodes 10 by preventing the unnecessary allocation of request and data queues 56 and 58.

Figure 6A:
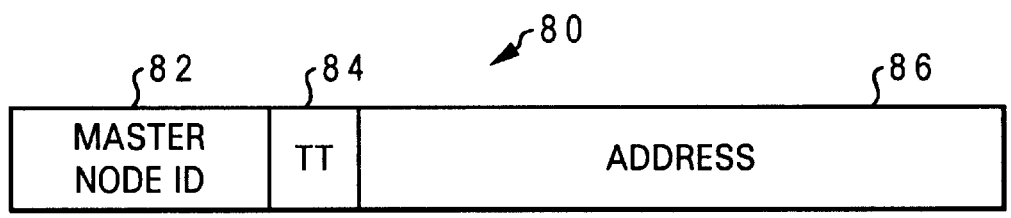
FIG. 6A depicts an exemplary format of a request transaction transmitted via one of the address channels of the data processing system shown in FIG. 1.

With reference now to FIG. 5A, a timing diagram of an exemplary request transaction in the data processing system of FIG. 1 is depicted. The request transaction is initiated by a master agent, for example, agent A0 of node 10a, mastering a read or write request transaction on the address channel 14 associated with its node, in this case address channel 14a. As shown in FIG. 6A, the request transaction 80 may contain, for example, a master node ID field 82 indicating the node ID of the master agent, a transaction type (TT) field 84 indicating whether the request transaction is a read (e.g., read-only or read-with-intent-to-modify) or write request, and a request address field 86 specifying the request address. The request transaction propagates sequentially from node 10a to node 10b and eventually to node 10k via address channel 14a. Of course, while the request transaction is propagating through other nodes 10, other request transactions may be made concurrently on address channel 10a or address channels 14b–14k.

As discussed above and as shown in FIG. 5A, after the snooper address and response sequencer 52 of each agent snoops the request transaction on address channel 14a, the request transaction is forwarded to snooper control logic 50, which provides to the local response and flow control logic 18 an appropriate snoop response indicating whether that agent can service (or participate in servicing) the request. Possible snoop responses are listed in Table I below in order of descending priority.

TABLE I

| Snoop response | Meaning |
| --- | --- |
| Retry | Retry transaction |
| Modified intervention | Agent holds requested line in a modified state in cache from which data can be sourced |
| Shared intervention | Agent holds requested line in a shared state from which data can be sourced |
| Shared | Agent holds requested line in a shared state in cache |
| Home | Agent is home agent of request address |
| Null | Agent does not hold the requested line in cache and is not the home agent |

Figure 6B:
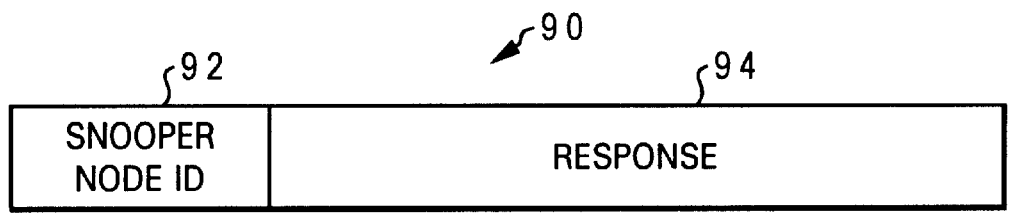
FIG. 6B illustrates an exemplary format of a partial combined response or combined response transmitted via one of the response channels of the data processing system of FIG. 1.

The snoop responses of only agents A0–Ak are then combined by response and flow control logic 18a into a $PCR_A$ output on PCR channel 24. As indicated in FIG. 6B, a response 90, which may be either a PCR or a CR, includes at least a response field 94 indicating the highest priority snoop response yet received and a snooper node ID field 92 indicating the node ID of the agent providing the highest priority snoop response yet received.

If during a determination of the appropriate snoop response, the snooper control logic 50 of an agent within node 10a determines that it is likely to have the highest priority snoop response of all agents within data processing system 8, for example, Modified Intervention for a read request or Home for a write request, the agent within node 10a asserts its cancel signal to the local cancellation logic 74, which outputs a cancel signal on cancel channel 27. As shown in FIG. 5A, the cancel signal is preferably asserted on cancel channel 27 prior to $PCR_A$. Thus, each agent within the nodes that subsequently receive the request transaction (i.e., nodes 10b–10k) can cancel the request queue 56 that is allocated within snooper control logic 50 to provide the snoop response for the request, and no other snoop responses and no PCR or CR will be generated for the request transaction.

Assuming that no agent within the master node 10a asserts its cancel signal to indicate that the request transaction will be serviced locally, agents B0–Bn within neighboring node 10b will provide snoop responses, which are combined together with $PCR_A$ by response and flow control logic 18b to produce $PCR_{A+B}$. The process of accumulating PCRs thereafter continues until response and flow control logic 18k produces $PCR_{A+B+\ldots+K}$, which contains the node ID of the agent that will participate in servicing the request transaction and the snoop response of that servicing agent. Thus, for a read request, the final PCR contains the node ID of the agent that will source the requested cache line of data, and for a write request, the final PCR specifies the node ID of the home agent for the requested cache line of data. When $PCR_{A+B+\ldots+K}$, which is equivalent to the CR, is received by response logic 60 within node 10a, response logic 60 of node 10a provides the CR to all agents on CR channel 26.

As illustrated in FIGS. 1 and 3, each agent within data processing system 8 is coupled to and snoops PCRs on PCR channel 24. In contrast to conventional multi-processor systems in which processors only receive CRs, the present invention makes PCRs visible to agents to permit agents that are not likely to service a snooped request to speculatively cancel queues (e.g., request and/or data queues 56 and 58) allocated to the request prior to receipt of the CR for the request. Thus, if an agent provides a lower priority snoop response to a request than is indicated in the PCR, the agent can safely cancel any queues allocated to the request prior to receiving the CR. This early deallocation of queues advantageously increases the effective size of each agent's queues.

With reference now to FIGS. 5B and 5C, there are respectively illustrated timing diagrams of an exemplary read-data transaction and an exemplary write-data transaction in data processing system 8 of FIG. 1. Each of the illustrated data transactions follows a request (address) transaction such as that illustrated in FIG. 5A and assumes agent B0 of node 10b participates with agent A0 of node 10a in the data transaction.

Figure 6C:
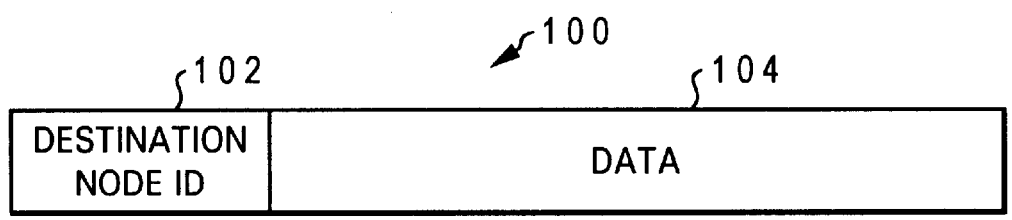
FIG. 6C depicts an exemplary format of a data transaction transmitted via the data channel of the data processing system of FIG. 1.

Referring first to the read-data transaction shown in FIG. 5B, when the CR output on CR channel 26 by response and flow control logic 18a is received by agent B0, agent B0, which responded to the request transaction with a Modified Intervention, Shared Intervention or Home snoop response indicating that agent B0 could source the requested data, sources a data transaction on data channel 16 containing a cache line of data associated with the request address. As illustrated in FIG. 6C, in a preferred embodiment a read-data or write-data transaction 100 includes at least a data field 104 and a destination node ID field 102 specifying the node ID of the node 10 containing the intended recipient agent (in this case node 10a). For read-data requests such as that illustrated in FIG. 5B, the destination node ID is obtained by the source agent from master node ID field 82 of the request transaction.

The data transaction sourced by agent B0 is then propagated via data channel 16 through each node 10 until node 10a is reached. As indicated in FIG. 5B, as response and flow control logic 18a of node 10a does not forward the data transaction to node 10b since the destination node ID contained in field 102 of the data transaction matches the node ID of node 10a. Snooper data sequencer 54 of agent A0 finally snoops the data transaction from data channel 16 to complete the data transaction. The cache line of data may thereafter be stored in cache hierarchy 32 and/or supplied to processing logic 30 of agent A0.

Figure 7:
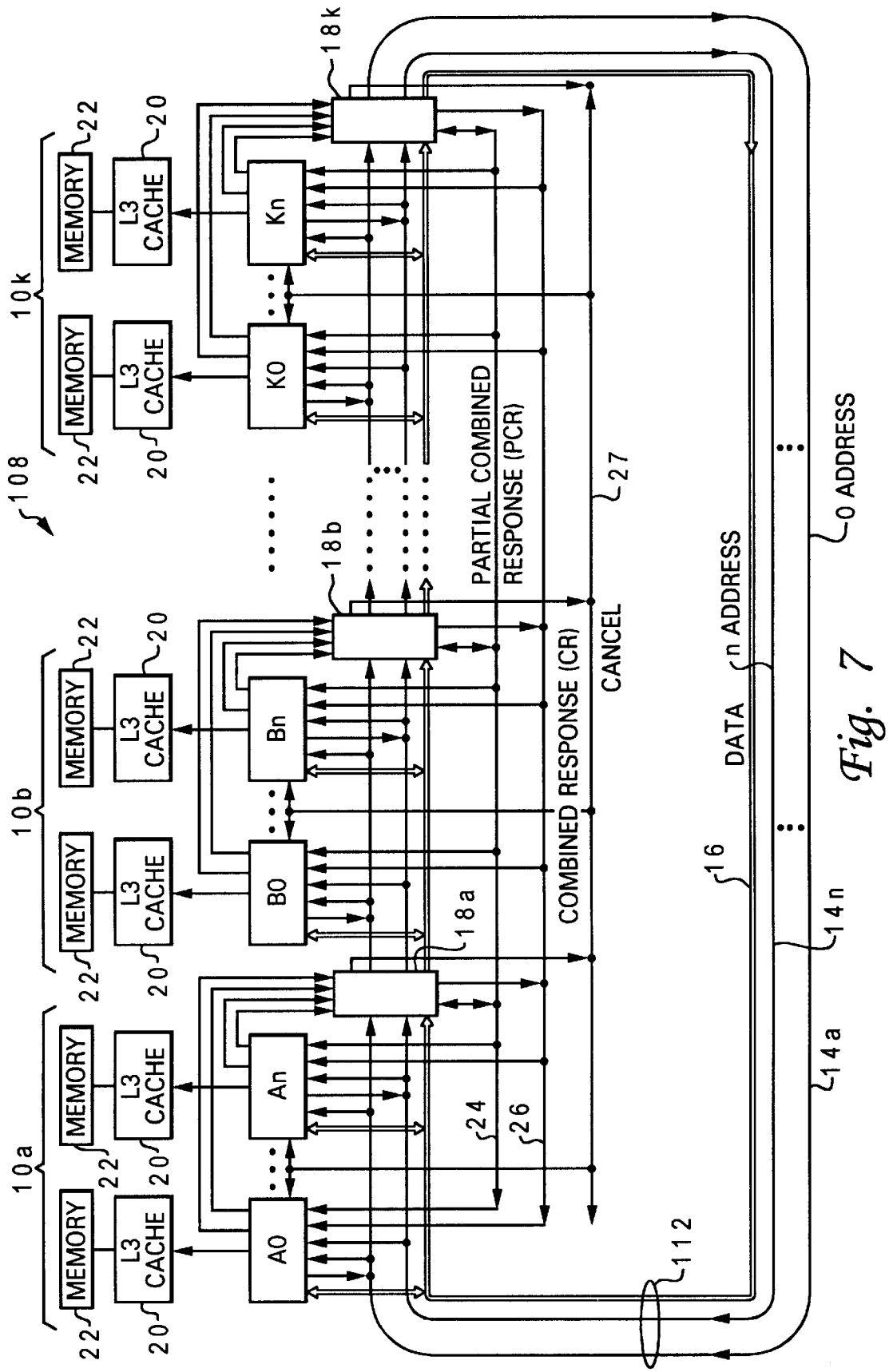
FIG. 7 illustrates an alternative embodiment of a multi-node data processing system having a non-hierarchical interconnect architecture in accordance with the present invention.

Referring now to FIG. 5C, a write-data transaction begins when agent A0, the agent that mastered the write request, receives the CR for the write request via CR channel 26. Importantly, the CR contains the node ID of the home agent of the request address (in this case the node ID of node 10b) in snooper node ID field 92, as described above. Agent A0 places this node ID in destination node ID field 102 of a write-data transaction and sources the data transaction on data channel 16. As indicated in FIG. 5C, response and flow control logic 18b of node 10b does not forward the data transaction to any subsequent neighboring node 10 since the destination node ID contained in field 102 of the data transaction matches the node ID of node 10b. Snooper data sequencer 54 of agent B0 finally snoops the data transaction from data channel 16 to complete the data transaction. The data may thereafter be written into local memory 22 of agent B0. With reference now to FIG. 7, there is illustrated an alternative embodiment of a multi-node data processing system having a non-hierarchical interconnect architecture in accordance with the present invention. As shown, data processing system 108, like data processing system 8 of FIG. 1, includes a number of nodes 10a–10k, which are coupled together in a ring configuration by a segmented interconnect 112 having one segment per node 10. Interconnect 112 includes at least one (and in the illustrated embodiment a single) data channel 16 and a plurality of non-blocking address channels 14a–14n that are each associated with a particular agent (or connection for an agent) in each one of nodes 10a–10k, such that only agents with the corresponding numerical designation can issue requests on an address channel 14. That is, although each agent snoops all address channels 14, only agents A0, B0, . . . , K0 can issue requests on address channel 14a, and only agents An, Bn, . . . , Kn can issue requests on address channel 14n. Thus, the principal difference between the embodiments depicted in FIGS. 1 and 7 is the centralization of master agents for a particular address channel 14 within a single node in FIG. 1 versus the one-per-node distribution of master agents for a particular address channel 14 among nodes 10 in FIG. 7.

One advantage of the interconnect architecture illustrated in FIG. 7 is that master agents need not arbitrate for their associated address channels 14. If the snooper control logic 50 of an agent detects that no address transaction is currently being received on the associated address channel, the master control logic 40 can source an address transaction on its address channel 14 without the possibility of collision with another address transaction.

As has been described, the present invention provides an improved non-hierarchical interconnect for a multi-node data processing system. The interconnect architecture introduced by the present invention has an associated communication protocol having a distributed combined response mechanism that accumulates per-node partial combined responses until a complete combined response can be obtained and provided to all nodes. For both read and write communication scenarios, the combined response, in addition to conveying the snoop response of a servicing agent, indicates the node ID of the node containing the servicing agent. In this manner, read and write data can be directed from a source agent to a target agent without being propagated to other nodes unnecessarily. The present invention also introduces two mechanisms to facilitate better communication queue management: a cancel mechanism to enable remote nodes to ignore a request that can be serviced locally and a speculative cancellation mechanism that enables an agent to speculatively cancel a queue allocated to a request in response to the partial combined response for the request.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:

an interconnect;

a plurality of nodes coupled to said interconnect, wherein each of said plurality of nodes includes at least one agent and at least one of said plurality of nodes includes multiple agents, wherein each agent in all of said plurality of nodes snoops a transaction transmitted on said interconnect and outputs a snoop response in response to snooping the transaction;

response logic within each node that accumulates a partial combined response to said transaction, said partial combined response representing a combination of the snoop response of each agent within its node and a partial combined response of any preceding node, wherein the response logic within anode among said plurality of nodes accumulates a partial combined response of one or more preceding nodes with the snoop response of each of one or more agents within its node to obtain a complete combined response to the transaction of all agents within all of said plurality of nodes, and wherein said response logic of the node provides said complete combined response to all of said plurality of nodes; and a queue that, responsive to an associated agent snooping the transaction, allocates an entry to service said transaction, wherein said queue speculatively deallocates said entry prior to receipt of said complete combined response by said associated agent in response to a partial combined response indicating that an agent other said associated agent will service said transaction.

2. The data processing system of claim 1, and further comprising a memory controller coupled to said associated agent, said memory controller containing said queue.

3. The data processing system of claim 2, wherein said transaction is a read request and said partial combined response indicates that a preceding node contains an agent having a higher sourcing priority.

4. The data processing system of claim 1, said plurality of nodes including a mastering node containing a mastering agent that issued said transaction, wherein response logic within said mastering node provides said complete combined response to all of said plurality of nodes.

5. The data processing system of claim 1, wherein said interconnect comprises:

a plurality of address channels, wherein each agent in all of said plurality of nodes is coupled to all of said plurality of address channels, and wherein each agent can only master transactions on an address channel associated with its node and snoops transactions on all of said plurality of address channels; and at least one data channel.

6. The data processing system of claim 1, wherein said plurality of nodes includes at least three nodes, and wherein said interconnect includes an address portion that couples said plurality of nodes in a ring topology.

7. The data processing system of claim 6, wherein:

said plurality of nodes sequentially receive said transaction from said interconnect; and said response logic produces said partial combined response to said transaction for its node based upon snoop responses of agents in its node and any node previously receiving the transaction on said interconnect.

8. A method of communication in a data processing system including an interconnect coupling a plurality of nodes that each include at least one agent and response logic, wherein at least one of said plurality of nodes includes a plurality of agents, said method comprising:

in response to snooping a transaction transmitted on said interconnect, outputting, from each agent, a snoop response and, at a queue having an associated agent, allocating an entry to service said transaction;

utilizing the response logic of each node, accumulating a partial combined response of the node and any preceding node until a complete combined response to said transaction for all of agents in all of said plurality of nodes is obtained, said partial combined response of each node representing a combination of the snoop response of each agent within that node and a partial combined response of any preceding node;

providing said complete combined response to all of said plurality of nodes; and prior to receipt of said complete combined response by said associated agent, speculatively deallocating said entry in response to a partial combined response indicating that an agent other said associated agent will service said transaction.

9. The method of claim 8, said data processing system further comprising a memory controller coupled to said associated agent, said memory controller containing said queue, wherein said step of allocating an entry to service said transaction comprises allocating an entry within said queue contained in said memory controller.

10. The method of claim 9, wherein said transaction is a read request, and wherein speculatively deallocating said entry comprises:

speculative deallocating said entry in response to said partial combined response indicating that a preceding node contains an agent having a higher sourcing priority.

11. The method of claim 8, said plurality of nodes including a mastering node containing a mastering agent that issued said transaction, wherein providing said complete combined response comprises providing said complete combined response to all of said plurality of nodes from response logic within said mastering node.

12. The method of claim 8, wherein said interconnect comprises a plurality of address channels and at least one data channel, said method further comprising:

coupling each agent in all of said plurality of nodes to all of said plurality of address channels and to said at least one data channel, such that each agent can only master transactions on an address channel associated with its node and snoops transactions on all of said plurality of address channels.

13. The method of claim 8, wherein said plurality of nodes includes at least three nodes, and wherein said interconnect includes an address portion, said method further comprising coupling said plurality of nodes in a ring topology with said address portion of said interconnect.

14. The method of claim 13, wherein:

said method further comprises said plurality of nodes sequentially receiving said transaction from said interconnect; and said accumulating step comprises response logic within each node producing a partial combined response to said transaction for its node based upon snoop responses of agents in its node and any node previously receiving the transaction on said interconnect.

* * * * *